US006980870B1

(12) United States Patent
Mok et al.

(10) Patent No.: US 6,980,870 B1
(45) Date of Patent: Dec. 27, 2005

(54) METHOD AND APPARATUS FOR OPTIMIZING, MANAGING AND SCHEDULING PERSONAL RELATIONSHIPS

(76) Inventors: Mimi T. Mok, 1531 Stone Canyon Rd., Los Angeles, CA (US) 90077; Philippe Laik, 12 Avenue de Fontvieille, Monte Carlo (CA)

( * ) Notice: Subject to any disclaimer, the term of this patent is extended or adjusted under 35 U.S.C. 154(b) by 972 days.

(21) Appl. No.: 09/649,259

(22) Filed: Aug. 28, 2000

(51) Int. Cl.[7] ............................................. G06F 19/00
(52) U.S. Cl. .............................. 700/90; 700/16; 705/10
(58) Field of Search ............. 700/16, 90, 17; 705/8–10

(56) References Cited

OTHER PUBLICATIONS http://www.LovingYou.com: unable to connect with server.
http://www.Oxygen.com, web page printed on Aug. 21, 2000.
http://www.About.com: unable to connect with server.
http://www.Swoon.com, web page printed on Aug. 21, 2000.
http://www.DrDrew.com, web page printed on Aug. 21, 2000.
http://www.eHarlequin.com, web page printed on Aug. 21, 2000.
http://www.XseeksY.com, web page printed on Aug. 21, 2000.
http://www.iVillage.com, web page printed on Aug. 21, 2000.
http://www.LoveTest.com: unable to connect with server.
http://www.AvantGo.com, web page printed on Aug. 21, 2000.
http://www.eCircles.com, web page printed on Aug. 21, 2000.
http://www.eGroups.com, web page printed on Aug. 21, 2000.
http://www.eVite.com, web page printed on Aug. 21, 2000.
http://www.SixDegrees.com, web page printed on Aug. 21, 2000, but site temporarily unavailable.
http://www.Lifeminders.com: unable to connect with server.
http://www.PlanetAll.com: unable to connect with server.
http://www.AnyDay.com, web page printed on Aug. 21, 2000.
http://www.yahoo.com, web page printed on Aug. 21, 2000.
http://www.amazon.com, web page printed on Aug. 21, 2000.

*Primary Examiner*—Kidest Bahta
(74) *Attorney, Agent, or Firm*—Trojan Law Offices

(57) ABSTRACT

The present invention is a method and apparatus to assist a user in optimizing a relationship with a contact person. The method includes inputting information regarding the relationship into the apparatus, classifying the relationship into at least one class, assigning a contact frequency to the relationship, providing the user with information about the relationship based on the at least one class, and contacting the user at the contact frequency with a first message regarding the relationship. The apparatus includes a storage device and a processor connected to the storage device. The storage device stores a first input from the user regarding the relationship, classifications for different types of relationships, information for each classification, contact frequencies for each type of relationship, and a program for controlling the processor. The processor is operative with the program and adapted to receive the first input from the user regarding the relationship, classify the relationship, assign a contact frequency to the relationship, provide to the user information based on the classification of the relationship and contact the user at the contact frequency with a first message regarding the relationship.

44 Claims, 5 Drawing Sheets

METHOD AND APPARATUS FOR OPTIMIZING, MANAGING AND SCHEDULING PERSONAL RELATIONSHIPS

FIELD OF THE INVENTION

The present invention relates, in general, to a method for optimizing, managing and scheduling the personal relationships of a user and an apparatus for performing the same.

BACKGROUND OF THE INVENTION

The most important asset in a person's life is a collection, not of material possessions, but of relationships with other people such as a spouse, children, friends, business associates, or classmates. Indeed, many people realize the importance of their relationships and make annual resolutions to keep in touch with others to increase the excitement and passion in their lives. Despite these good intentions, most people do not have the time, organization or knowledge to cultivate their relationships effectively. The claimed invention provides the tools and knowledge to efficiently develop and enhance all personal and business relationships, quickly and easily.

Prior methods and devices for developing and cultivating relationships were based on static and generic information that were not specialized for the type and goal of each particular relationship. Also, these prior methods could not give specialized information regarding the relationship when the person needed it most—just prior to communicating with the other person in the relationship (hereinafter "the contact person"). Additionally, prior methods and devices could not collect information and schedule activities regarding various types of relationships into a simple and specialized action list on which a person could act. Consequently, a person would inadvertently neglect many relationships.

A need therefor exists for a method and apparatus to manage and schedule activities that will help maintain relationships with contact persons and provide specialized information about each particular relationship to optimize each and every relationship with contact persons.

SUMMARY OF THE INVENTION

A first aspect of the invention involves a method to assist a user in optimizing a relationship with a contact person. The method includes inputting information regarding the relationship into the apparatus, classifying the relationship into at least one class, assigning a contact frequency to the relationship, providing the user with information about the relationship based on the at least one class, and contacting the user at the contact frequency with a first message in the form of a reminder regarding the relationship.

Implementation of the first aspect of the invention may include one or more of the following. The step of inputting information includes information about the contact person and the first message includes information regarding the contact person. The user assigns the contact frequency or the apparatus assigns the contact frequency. The apparatus assigns the contact frequency and the user reassigns the contact frequency. The classification step further includes classifying the relationship into a plurality of classes, wherein the plurality of classes may include one master class and one sub class. The first message includes a means for inputting details of an action taken by the user in response to the first message. After the contacting step, the method further includes the user inputting details of an action taken in response to the first message and, after the user inputs those details, contacting the user at the contact frequency with a second message regarding the relationship, the second message including those details. The first message includes educational information and advice based on the at least one class, gift recommendations, activity suggestions, suggested topics of conversation, or prewritten correspondence. The method includes contacting the contact person with a second message wherein the second message includes a means for inputting information regarding the relationship. The step of inputting information further comprises a relationship expert inputting information. The first message may further include information regarding a vendor, and the method may provide access to the vendor.

A second aspect of the invention involves an apparatus to assist a user in optimizing a relationship with another contact person. The apparatus includes a storage device and a processor connected to the storage device. The storage device stores a first input from the user regarding the relationship, classifications for different types of relationships, information for each classification, contact frequencies for each type of relationship, and a program for controlling the processor. The processor is operative with the program and adapted to receive the first input from the user regarding the relationship, classify the relationship, assign a contact frequency to the relationship, provide information to the user based on the classification of the relationship and contact the user at the contact frequency with a first message regarding the relationship.

Implementation of the second aspect of the invention may include one or more of the following. The program is further adapted to receive a second input from the user regarding information about the contact person and a storage device further stores the second input. The first message includes information about the contact person. The program is adapted to receive a second input from the user regarding the contact frequency and reassign the contact frequency to the relationship based on the second input, and the storage device further stores the second input. The program is adapted to classify the relationship into a plurality of classes, which may include one master class and one sub-class. The program also may be adapted to receive a second input from the user regarding the details of an action taken by the user in response to the first message and the storage device further stores the second input. The program is adapted to contact the user at the contact frequency with a second message regarding the relationship, the second message further including the details of an action taken in response to the first message. The first message includes information based on the at least one class. The first message further includes gift recommendations, activity suggestions, topics of conversation, or prewritten correspondence. The program is adapted to contact the contact person with a second message and the storage device further stores a second input from the contact person regarding the relationship, and the program is adapted to receive the second input from the other person regarding the relationship. The program is adapted to receive a second input from the relationship expert and the storage device further stores the second input. The apparatus is connected to a remote processor and the first message may include a link to the second processor. The first message may comprise information regarding a vendor, and the processor is linked to the vendor. This and further objects and advantages will be apparent to those skilled in the art in connection with the drawing and the detailed description of the preferred embodiments set forth below.

DETAILED DESCRIPTION OF THE PREFERRED EMBODIMENTS

The method and apparatus of the present invention resolve the problems of the past devices and methods (i.e., non-specialized information and no scheduling capability) with two important attributes. First, the method provides the user with special information and education regarding the type of relationship the user has with each contact person. Second, the method provides the user with reminders to cultivate each individual relationship at regular intervals.

Figure 1:
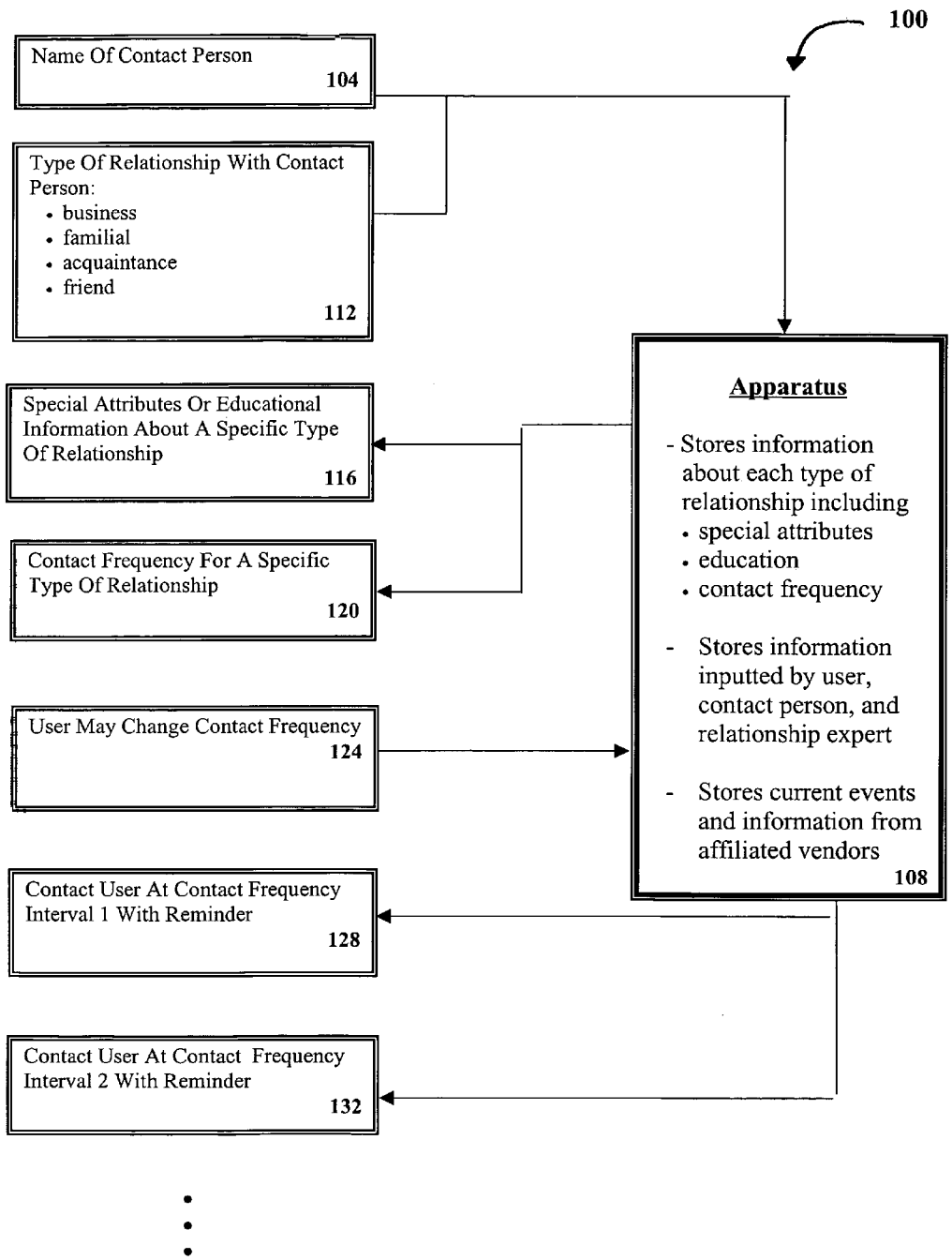
FIG. 1 is a block diagram showing a preferred embodiment of the method to optimize, manage and schedule relationships.

With regard to FIG. 1, a preferred embodiment of the method 100 for optimizing, managing, and scheduling relationships will be discussed. The method 100 uses an apparatus 108 that preferably stores information from a user regarding the user's specific types of relationships, information regarding the contact person, information regarding current events and information from affiliated vendors. The apparatus 108 also initiates reminders to the user at regular intervals 128 and 132 dictated by the contact frequency, as discussed below.

The method 100 begins with the user inputting the name of the contact person 104. The user also inputs the type of relationship the user has with the contact person 112. For example, the user may use the method 100 to manage a relationship with his entire family consisting of Tom (brother), Mary (sister), Sara (mother), and Frank (father). Beginning with Tom, the user may classify him as a family member. The method 100 further allows the user to subclassify Tom in the subclass "Brother." Thus, in this example, Tom would be a member of the "Family" master class, and the "Brother" subclass. Similarly, Mary, Sara, and Frank would be master classed in "Family" and subclassed in "Sister," "Mother," and "Father," respectively. While a user may use the method 100 to optimize familial relationships, the method 100 is not limited to only this application. For example, a user may also use the method 100 to manage and optimize institutional type relationships. Preferably, in the institutional setting, this method would provide information regarding the institution, such as the possible structure that exists in the institution (e.g., the R & D group, marketing group, managers, engineers, etc.) and the specific goals within these groups.

Once the type of relationship has been classified, the method 100 provides information about the classification 116 and the contact frequency for that type of classification 120. Information regarding the classification 116 is preferably educational. For example, Tom in the above example is the brother of the user. The method 100 would provide information regarding the brotherly relationship, e.g., brothers enjoy sporting events and cocktails with each other. The second piece of information is the contact frequency for the type of relationship 120. Again, Tom, in the running example, may enjoy a contact frequency of once a month. The contact frequency is based on sociological research on brotherly relationships, and the result of that search may reveal that a brotherly relationship is best optimized by cultivating the relationship once a month. At this point, however, the user may change the contact frequency to fit the special dynamics of the relationship. For example, if Tom is ill, then once a month may not adequately cultivate that relationship, and the user may choose more frequent contact. Unless the user provides otherwise, the method 100 sets the contact frequency at the preset level for that type of relationship. The user may change the contact frequency at any point.

The method 100 further provides for reminders at the contact frequency intervals 128 and 132. The reminder may include the name of the contact and other valuable information. Preferably, the reminders at the contact frequency intervals 128 and 132 include information unique to the relationship.

Figure 2:
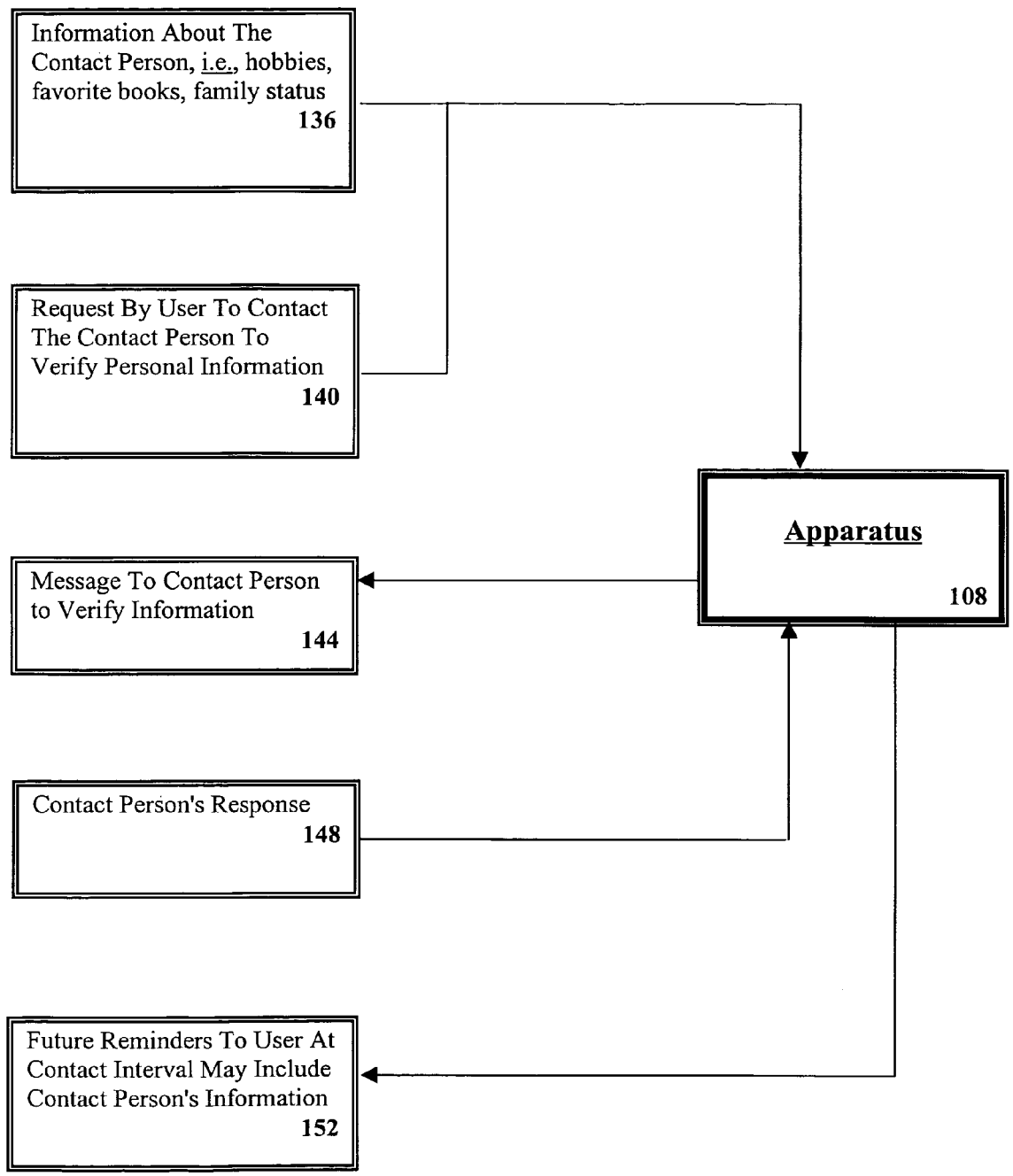
FIG. 2 illustrates a feature of the preferred embodiment showing how a user provides unique information concerning the relationship to the method.

With reference to FIG. 2, a preferred embodiment of the method 100, wherein the user inputs unique information included in the contact reminder will now be discussed. The user may input information that is unique to the personal relationship 136, such as the contact person's hobbies, or favorite sports. The method 100 then would send future reminders at the contact frequency, wherein the reminders contain information unique to the contact person 152. The reminders could also preferably include gift ideas, activity suggestions, topics of conversation or prewritten correspondence directed at the contact person, each based on the personal information of the contact person.

The apparatus 108 of the method 100 preferably stores information from affiliated vendors and stores current events (i.e., top news stories and business trends) such that the reminders may be personalized to match the personal information regarding the contact person. A vendor may include, for example, an on-line book and video store, or a sports-bar restaurant. The method 100 could then preferably include sending reminders at the contact frequency with a video gift selection from the affiliated vendor or a dining suggestion for the affiliated sports-bar restaurant vendor. The reminder may also contain topics of conversation that would interest the contact person, preferably based on a comparison of current events to the personal information regarding the contact person. The reminder may also contain a prewritten correspondence, such as a greeting card e-mail directed at the contact person and preferably based on the personal information regarding the contact person. The user could edit the prewritten correspondence before sending it to the contact person.

The user may also request that the contact person verify that the personal information inputted by the user 140 is accurate. In some cases, the user may know little about the contact person and may request that the contact person input unique personal information. This may be the case in a limited business contact or a first-time acquaintance contact. Ultimately, the information either inputted by the user 136, and verified or corrected by the contact person 148, may be included in future reminders to the user. As described above, the method 100 preferably provides the user with gift ideas, activity suggestions, conversation topics, or prewritten correspondence that would cultivate and nurture the relationship with the contact person.

The user may input personal information or request unique information from a contact person when the method 100 is initiated or any time after initiating the method 100.

Figure 3:
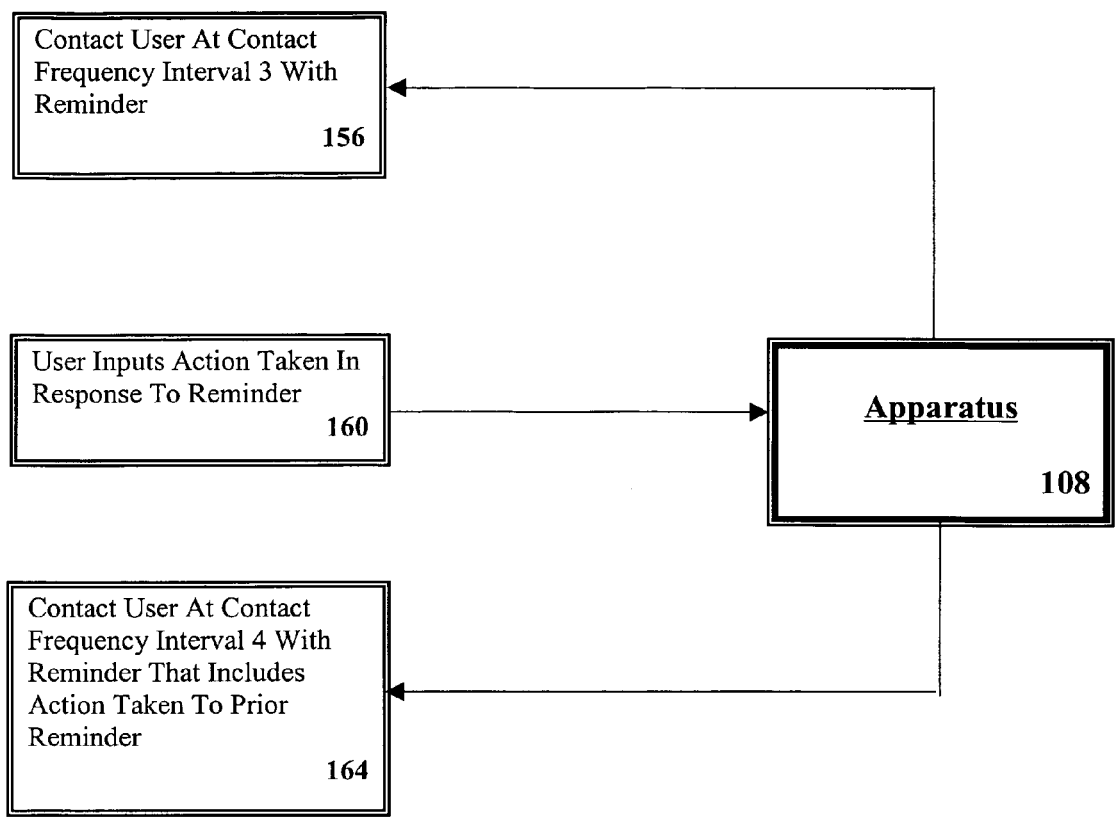
FIG. 3 illustrates another feature of the preferred embodiment showing how a user logs the action taken in response to a reminder generated through the method.

The user may also input personal information regarding the user himself. The method 100 could then send reminders at the contact frequency, wherein the reminders contained information regarding the user. For example, if the user inputted that he enjoyed muscle cars, the method 100 could include in the reminder an activity suggestion regarding a car show staged at the local fairgrounds. Alternatively, the reminder could include an inspirational message such as "When you smile on the outside, you just can help but smile on the inside." Providing an inspirational message or activity suggestion geared solely to the user is advantageous because the user is more apt to feel emotionally positive after receiving the reminder and may more effectively act on the reminder to cultivate the relationship with the contact person. As the user receives reminders at the contact interval, it is further preferable to log the action taken by the user in response to the reminder. For example, in FIG. 3, the method 100 provides a reminder message at the contact interval 156. The message may state something like: "This is a reminder message that you should cultivate your relationship with your brother Tom. Tom enjoys football and muscle cars. Gift suggestions: Videotapes on football bloopers from Book-Store On-line. Activity suggestions: Take brother out to The View sports bar to watch football. Conversation Topics: The injuries suffered by Ryan Lief, the quarterback for the San Diego Chargers."

In response, the user may, in fact, take the brother out to the vendor restaurant (The View sports bar) and not act on the gift suggestion. The user would then input this action taken in response to the reminder 160. Alternatively, the user may input that he did nothing in response to the reminder 160. Future reminders would include information about the action taken to previous reminders 164. If, for example, the user did treat his brother to a dinner at The View sports bar, the user may not want to repeat that activity. Instead, the user may want to act on the gift suggestion for a football blooper video from the vendor Book-Store On-Line, or may contact his brother and talk about Ryan Lief's injuries. And if the user did nothing in response, the user may realize the neglect of the relationship when the next reminder indicates that the user has done nothing to cultivate the relationship. The more the user employs the method 100, the more the user becomes educated in communication skills and the psychology of his relationships. After receiving relationship advice and reminders from the method 100, the user should experience a positive difference in his life, especially in his relationships.

As more information about relationships is gathered, either through the user, the contact person or through new sociological research, that information may be added to the method 100 to refine the effectiveness of the method 100. For example, if new research were to show that friends neglected for more than three months have a tendency to question the true commitment of the friendship, and the user has inputted that he has failed to respond to each reminder for five months, the method 100 should be updated to include the valuable information. Preferably a relationship expert (i.e., a sociologist, psychologist, etc.) would review the information inputted by the user and contact person, and would also review the new sociological research. The relationship expert could then update the method 100 as appropriate to, fit the needs of the relationship.

Figure 4:
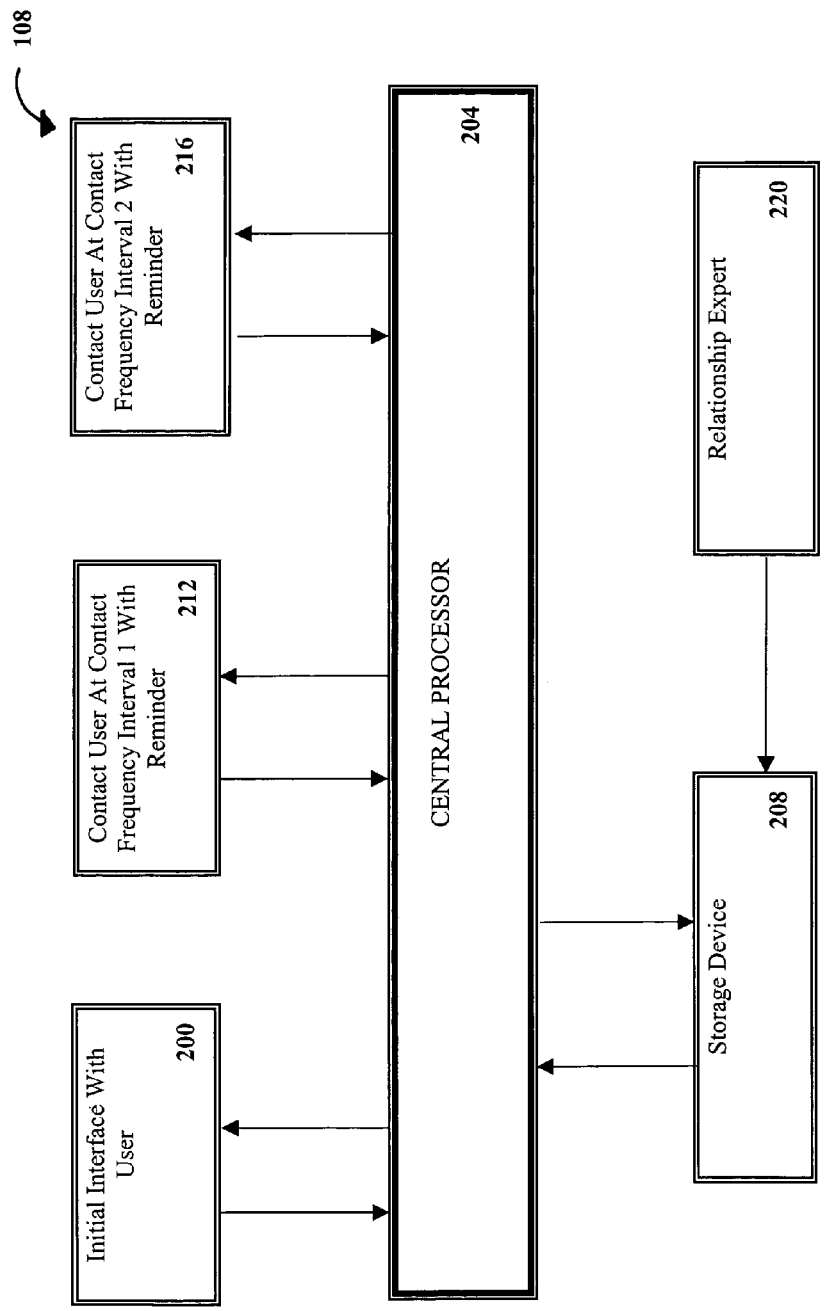
FIG. 4 illustrates a preferred embodiment of the apparatus used to implement the method.

With reference to FIG. 4, an apparatus 108 for optimizing, managing and scheduling personal relationships constructed in accordance with the method 100 described above will now be discussed. Although the apparatus 108 described further below is described in conjunction with the Internet and a web site, it will be readily apparent to those skilled in the art that the disclosed apparatus 108 can be implemented through a variety of other devices such as, but not by way of limitation, cellular telephones, personal digital assistants (i.e., 3-com's Palm Pilot, and Apple's Newton MessagePad), home computers and other wireless enabled devices.

The apparatus 108 contains four major components: the user interface 200, the central processor 204, the storage device 208, and a program stored on the storage device 208 adapted to operate the central processor 204. The user interface 200 preferably allows a user to input information into the apparatus 108 and modify the functions of the program to fit the particular needs of the user (including the contact frequency as described above). The user interface 200 may also include the reminders made by the system at the contact intervals 212 and 216 as described above. The central processor 204 receives the information through the user interface 200 and sends it to the storage device 208. The central processor 204 also processes information stored in the storage device 208 and outputs information to the user interface 200. The storage device 208 stores information from the user interface 200, information relating to various types of relationships, and stores information generated by the central processor 204. Finally, the program is stored in the storage device 208 and controls the central processor 204 and the flow of data between the storage device 208 to central processor 204, and between the central processor 204 and the user interface 200.

In a preferred embodiment, the user begins his interaction with the apparatus 108 by connecting to the web site, engaging the user interface 200, and inputting information regarding a relationship the user would like the apparatus 108 to monitor and optimize. The information would include the name of the contact person, the type of relationship the user has with the contact person as described above, and the user's email address. The central processor 204 transfers the information inputted by the user through the user interface 200 into the storage device 208. The central processor 204 searches the storage base for classifications based on the same type of relationship and information relating to the same type of relationship as inputted by the user. Once a match is located, the central processor 204 outputs to the user interface 200 information regarding that type of relationship and a contact frequency based on that type of relationship. The central processor 204 also classifies that relationship, assigns the contact frequency to that classification, and stores this information in the storage device 208. As discussed above with reference to the method 100, the user may choose to change the contact frequency interval to better meet the needs of the relationship. The user, through the user interface 200, may reassign the contact frequency at the initial inputting stage, or at any time thereafter.

At the contact frequency intervals, the central processor 204 sends an email reminder to the user through the user interface 212 and 216 (illustrated as contact frequency interval 1 and contact frequency interval 2 in FIG. 4). The email reminder is designed to prompt the user to cultivate and nurture the relationship. To achieve this goal, the email reminder preferably includes unique information regarding the relationship with the contact person. For example, at the beginning of the interaction with the apparatus 108, the user may also input personal and unique information concerning the relationship. The central processor 204 preferably sends that information to the storage device 208 and also searches through the databank of the storage device 208 to match appropriate gift ideas, activity suggestions, topics of conversation, or prewritten correspondence that would help cultivate the relationship. Those suggestions, made at the contact intervals 212 and 216, would be included in future email reminders to the user. It is also preferable to allow the user to input the action taken in response to email reminders 212 and 216. As described above, this allows the user to monitor his commitment to the relationship and helps prevent a routine of repeating the same activities over and over again.

Often a single classification may be sufficient to fully cultivate a relationship. Preferably, however, the apparatus 108 may subclassify the relationship into a subclass. This may be preferred in a familial situation as discussed above. For example, the family consisting of the user, Tom, Mary, Sara and Frank constitutes one class—i.e., family. Under a family classification, a contact frequency of once every two months may be sufficient. The brother subclass of the family may require a more frequent contact interval that may not be needed in the master family class. Also, the activity suggestion for the brother subclass may not include the same activities as that for the entire family. Thus, to fully cultivate the brother relationship and the family relationship, subclassification may be preferable.

As described above with respect to the method 100, a relationship expert may update the information 220 used by the apparatus 108 to optimize and refine the capabilities of the apparatus 108.

Figure 5:
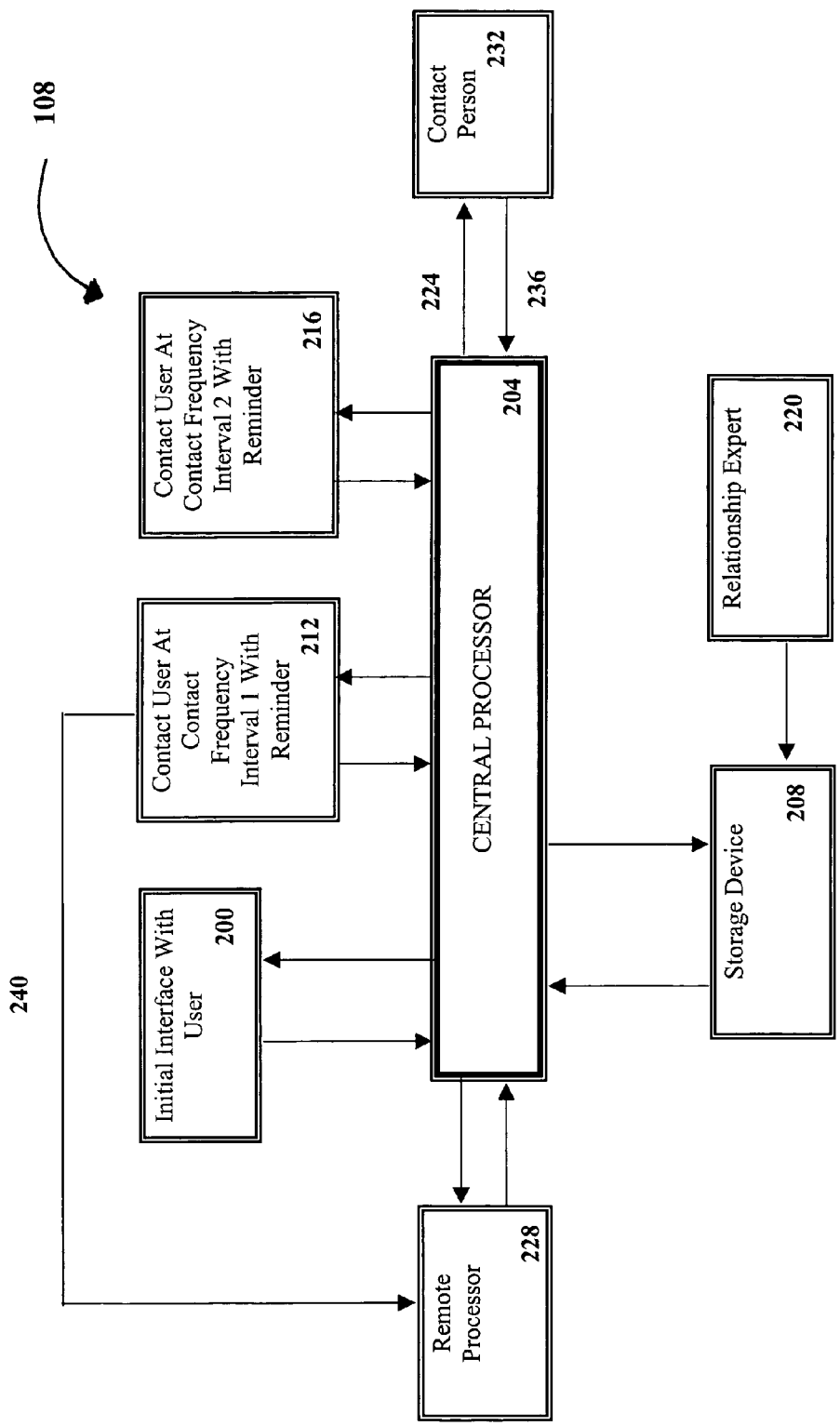
FIG. 5 illustrates another preferred embodiment of the apparatus used to implement the method with a link to a remote processor.

With reference to FIG. 5, another preferred embodiment of the apparatus 108 will now be discussed. The apparatus 108 contains all the same basic elements as already described in reference to FIG. 4, i.e., the user interface 200, the central processor 204, the storage device 208 and the program adapted to control the central processor 204. The preferred embodiment illustrated in FIG. 5 adds two new features: contacting the contact person for information 224 and linking to a remote processor 228 to assist in optimizing the relationship 228. The basic elements included in this preferred embodiment are substantively identical to those already discussed above; thus the description of this embodiment will be limited to the two new features.

First, the apparatus 108 includes in the user interface 200 an option for contacting the contact person 232 to solicit information. As discussed above, the user may want the contact person to confirm that the information concerning the contact person is accurate. In some cases, the user may not know very much about the contact person, and may solicit information to tailor future gift or activity suggestions. In either event, the apparatus 108 is adapted to send a message to the contact person 224, offering the contact person the ability to edit and revise the personal information 236. Given that this system is preferably run on an Internet web site, the message to the contact person 232 would preferably be in the form of an email message.

The second feature includes a link to a remote processor 228. For example, the gift suggestion as discussed above may be a football bloopers video. The apparatus 108 may send an email reminder at the contact frequency interval 212 with the video gift suggestion and a hyperlink 240 to the vendor Book-Store On-Line web site that offers such videos. The user could access that link 240 and connect to the remote processor 228. As a second example, at the contact frequency interval 212, the apparatus 108 may send an email reminder regarding Ryan Lief's injury with a link 240 to a news article regarding the injury. The user may select that link 240 and connect to the remote processor 228 to learn more about the suggested topic. As yet another alternative, the apparatus 108 may send a reminder at the contact frequency interval 212 to cultivate the relationship, and included in that reminder a link 240 to a newly published article on how to reduce stress. The user may select the link 240 and read the article before acting on cultivating the relationship. In either the video gift, the suggested topic, or the published article alternative, the remote processor 228 broadens the avenues by which the user may cultivate and nurture the relationship. It should be readily apparent to one in the art that the apparatus 108 may be connected to more than one remote processor 228.

While preferred method and apparatus embodiments have been shown and described, it will be apparent to one of ordinary skill in the art that numerous alterations may be made without departing from the spirit or scope of the invention. Therefore, the invention is not to be limited except in accordance with the following claims.

We claim:

1. A method for using a relationship manager apparatus to assist a user in optimizing a relationship with a contact person, the method comprising:

inputting information regarding the relationship into the apparatus;

classifying the relationship into at least one class;

assigning a contact frequency to the relationship, said contact frequency being chosen to optionally cultivate said relationship;

providing the user with information about the relationship based on the at least one class; and contacting the user at the contact frequency with a first message regarding the relationship, said first message being in the form of a reminder providing the user with information unique to said relationship.

2. The method according to claim 1, wherein the step of inputting information further comprises inputting information about the contact person.

3. The method according to claim 2, wherein the first message comprises information regarding the contact person.

4. The method according to claim 1, wherein the step of inputting information further comprises inputting information about the user.

5. The method according to claim 4, wherein the first message comprises information regarding the user.

6. The method according to claim 1, wherein the user assigns the contact frequency.

7. The method according to claim 1, wherein the apparatus assigns the contact frequency.

8. The method according to claim 7, wherein the user reassigns the contact frequency.

9. The method according to claim 1, wherein the classification step further comprises classifying the relationship into a plurality of classes.

10. The method according to claim 9, wherein the plurality of classes comprises at least one master class and at least one sub class.

11. The method according to claim 1, wherein the first message comprises a means for inputting details of an action taken by the user in response to the first message.

12. The method according to claim 11, wherein after the contacting step, the method farther comprising:

the user inputting details of an action taken in response to the first message; and after the user inputs the details of an action taken in response to the first message, contacting the user at the contact frequency with a second message regarding the relationship, the second message further comprising the details of an action taken in response to the first message.

13. The method according to claim 1, wherein the first message comprises educational information and advice based on the at least one class.

14. The method according to claim 1, wherein the first message comprises gift recommendations.

15. The method according to claim 1, wherein the first message comprises activity suggestions.

16. The method according to claim 1, wherein the first message comprises suggested topics of conversation.

17. The method according to claim 1, wherein the first message comprises prewritten correspondence.

18. The method according to claim 1, further comprising contacting the contact person with a second message.

19. The method according to claim 18, wherein the second message comprises a means for inputting information regarding the relationship.

20. The method according to claim 1, wherein the step of inputting information further comprises a relationship expert inputting information.

21. The method according to claim 1, wherein the first message comprises information regarding a vendor.

22. The method according to claim 21, further comprising providing access to the vendor.

23. An apparatus to assist a user in optimizing a relationship with a contact person, the apparatus comprising:
a storage device;
a processor connected to the storage device;
the storage device storing
 a first input from the user regarding the relationship;
 classifications for different types of relationships;
 information for each classification;
 contact frequencies for each type of relationship; and,
 a program for controlling the processor; and
the processor operative with the program adapted to
 receive the first input from the user regarding the relationship;
 classify the relationship;
 assign a contact frequency to the relationship, said contact frequency being chosen to optimally cultivate said relationship;
 provide to the user information based on the classification of the relationship; and
 contact the user at the contact frequency with a first message regarding the relationship, said first message being in the form of a reminder providing the user with information unique to said relationship.

24. The apparatus according to claim 23, wherein the program is further adapted to receive a second in-put from the user regarding information about the contact person, and the storage device further stores the second input.

25. The apparatus according to claim 24, wherein the first message comprises information regarding the contact person.

26. The apparatus according to claim 23, wherein the program is further adapted to receive a second input from the user regarding information about the user, and the storage device further stores the second input.

27. The apparatus according to claim 23, wherein the first message comprises information regarding the user.

28. The apparatus according to claim 23, wherein the program is further adapted to
 receive a second input from the user regarding the contact frequency; and
 reassign the contact frequency to the relationship based on the second input; and
the storage device further stores the second input.

29. The apparatus according to claim 23, wherein the program is further adapted to classify the relationship into a plurality of classes.

30. The apparatus according to claim 29, wherein the plurality of classes comprises at least one master class and at least one sub-class.

31. The apparatus according to claim 23, wherein the program is further adapted to receive a second input from the user regarding the details of an action taken by the user in response to the first message, and the storage device further stores the second input.

32. The apparatus according to claim 31, wherein the program is further adapted to contact the user at the contact frequency with a second message regarding the relationship, the second message further comprising the details of an action taken in response to the first message.

33. The apparatus according to claim 23, wherein the first message comprises information based on the at least one class.

34. The apparatus according to claim 23, wherein the first message further comprises gift recommendations.

35. The apparatus according to claim 23, wherein the first message further comprises activity suggestions.

36. The apparatus according to claim 23, wherein the first message further comprises suggested topics of conversation.

37. The apparatus according to claim 23, wherein the first message further comprises prewritten correspondence.

38. The apparatus according to claim 23, wherein the program is further adapted to contact the other person with a second message.

39. The apparatus according to claim 38, wherein the program is further adapted to receive a second input from the contact person regarding the relationship and the storage device further stores the second input.

40. The apparatus according to claim 23, wherein the program is further adapted to receive a second input from the relationship expert and the storage device further stores the second input.

41. The apparatus according to claim 23, wherein the apparatus is connected to a remote processor.

42. The apparatus according to claim 41, wherein the first message comprises a link to the second processor.

43. The apparatus according to claim 23, wherein the first message comprises information about a vendor.

44. The apparatus of claim 43, wherein the processor is linked to the vendor.

* * * * *